United States Patent [19]

Tsujii

[11] Patent Number: 4,984,171
[45] Date of Patent: Jan. 8, 1991

[54] CONTROL METHOD AND APPARATUS FOR AUTOMATIC WELDING MACHINE

[75] Inventor: Gen Tsujii, Sayama, Japan

[73] Assignee: Honda Giken Kogyo Kabushiki Kaisha, Tokyo, Japan

[21] Appl. No.: 313,000

[22] Filed: Feb. 21, 1989

[30] Foreign Application Priority Data

Feb. 23, 1988 [JP] Japan .................................. 63-38534

[51] Int. Cl.$^5$ ...................... G06F 15/46; B23K 9/12; B25J 11/00
[52] U.S. Cl. ....................................... 364/477; 901/42; 219/86.41
[58] Field of Search ................. 364/477; 219/110, 109, 219/138, 86.1–86.41; 901/31, 33, 41, 42

[56] References Cited

U.S. PATENT DOCUMENTS

| | | | |
|---|---|---|---|
| 4,419,558 | 12/1983 | Stiebel | 219/109 |
| 4,684,778 | 8/1987 | Cecil | 901/42 |
| 4,707,582 | 11/1987 | Beyer | 901/42 |
| 4,841,113 | 6/1989 | Hamada et al. | 219/110 |

FOREIGN PATENT DOCUMENTS

| | | |
|---|---|---|
| 58-9287 | 1/1983 | Japan . |
| 2126380A | 3/1984 | United Kingdom . |

*Primary Examiner*—Jerry Smith
*Assistant Examiner*—Jim Trammell
*Attorney, Agent, or Firm*—Armstrong, Nikaido, Marmelstein, Kubovcik & Murray

[57] ABSTRACT

Change in outputs from a pair of distance sensors mounted on a pair of gun arms is monitored to determine whether or not the gun arms have started to move toward opening to activate the robot carrying the welding gun. If no change in output occurs in either sensor when an instruction is given to open (generally because a fusion weld of the electrode to the workpiece has occurred), an alarm is activated and the robot is not.

2 Claims, 2 Drawing Sheets

CONTROL METHOD AND APPARATUS FOR AUTOMATIC WELDING MACHINE

BACKGROUND OF THE INVENTION

This invention relates to a control method and a control apparatus for an automatic welding machine in which a welding gun is moved by a robot successively to a plurality of welding spots on a workpiece in order to carry out spot welding.

In a conventional automatic welding machine, certain steps of operation are successively performed. After a welding gun is moved by operation of a robot to a welding spot, the workpiece is clamped under pressure between electrode tips attached to the front ends of a pair of gun arms of the welding gun and then the gun is energized. The welding gun is opened after a lapse of a predetermined hold time following completion of the energization. When the opening of the welding gun is confirmed by a signal from a sensor which detects the relative displacement between the pair of gun arms of the welding gun, the robot is operated to move the welding gun to the next welding spot.

In some cases, however, one of the electrode tips of the welding gun becomes fusion-welded to the workpiece during the welding operation. With an automatic welding machine of the foregoing type, even when an electrode tip attached to one of the gun arms of the welding gun becomes fusion-welded to the workpiece, the other gun arm is free to move to open if the welding gun is operated for opening thereof. Thus, the sensor detecting the relative displacement between the two gun arms outputs the signal indicating that the welding gun is open, and the robot is therefore activated to move the welding gun. This can cause the gun arm to be subjected to undue force and/or the workpiece to be damaged since the tip is still fusion-welded to the workpiece.

As disclosed in the Japanese Unexamined Utility Model Registration Application Publication Jikkai Sho 58-9287, a welding gun fusion-weld detection apparatus can include a pair of limit switches to detect the actual return of each of the gun arms of the welding gun to their respective open positions. Whether or not there is fusion weld of one of the gun arm electrode tips to the workpiece is determined by signals from these limit switches.

By making use of the technology disclosed in the abovementioned publication, it is possible to arrange the welding machine so that the robot may be operated when a pair of the gun arms of the welding gun are both returned to their respective open positions. However, it should be noted that it takes about 80 milli-seconds or so for the gun arms to return to their open positions after the welding gun is given an instruction to open. This much time required to confirm that the welding gun is opened each time the welding at a welding spot is completed can accumulate a great loss of time that can not be disregarded when the number of welding spots is of considerable magnitude.

The present invention has for its object to provide a control method and a control apparatus for an automatic welding machine, wherein the time needed to detect whether or not there is a fusion weld of an electrode tip of the gun arm of the welding gun to the workpiece is reduced as much as possible so as to contribute to improvement of the work efficiency.

SUMMARY OF THE INVENTION

To achieve the above object, the present invention provides a control method comprising the steps of: detecting by a pair of distance sensors the respective movement of gun arms of the welding gun; determining from changes in outputs of the respective distance sensors at the time when the welding gun is being opened after completion of the welding at each welding spot whether or not each gun arm has started to move toward its opening side; and operating the robot when it is confirmed that the gun arms have both started moving toward their opening sides.

Further, the control apparatus which is provided to implement the foregoing control method comprises: a pair of distance sensors detecting the respective movements of a pair of gun arms of the welding gun; a discrimination means which operates at the time when the welding gun is being opened after completion of the welding at each welding spot to store outputs of the distance sensors and determine from changes in the outputs whether or not each gun arm has started to move toward its opening side; and a signal generation means which outputs an instruction signal for operation of the robot when it is confirmed that both gun arms have started alike to move toward their opening sides and which outputs a signal indicating the fusion weld to the workpiece of an electrode tip of the welding gun when at least one of the gun arms has not started to move toward its opening side even after the lapse of a predetermined time.

As soon as each gun arm starts moving toward its opening side, the output of each distance sensor starts. The signal instructing the robot to operate is outputted while both the gun arms are still being opened.

If the electrode tip is fusion-welded to the workpiece, the gun arm with that electrode tip can not move so that the output from the distance sensor for the same will not change. From the foregoing, it can be determined whether or not there is the fusion weld of the electrode tip of the welding gun to the workpiece.

BRIEF DESCRIPTION OF THE DRAWINGS

The above and other objects and the attendant advantages of the present invention will become readily apparently reference to the following detailed description when considered in conjunction with the accompanying drawings wherein.

Figure 1:
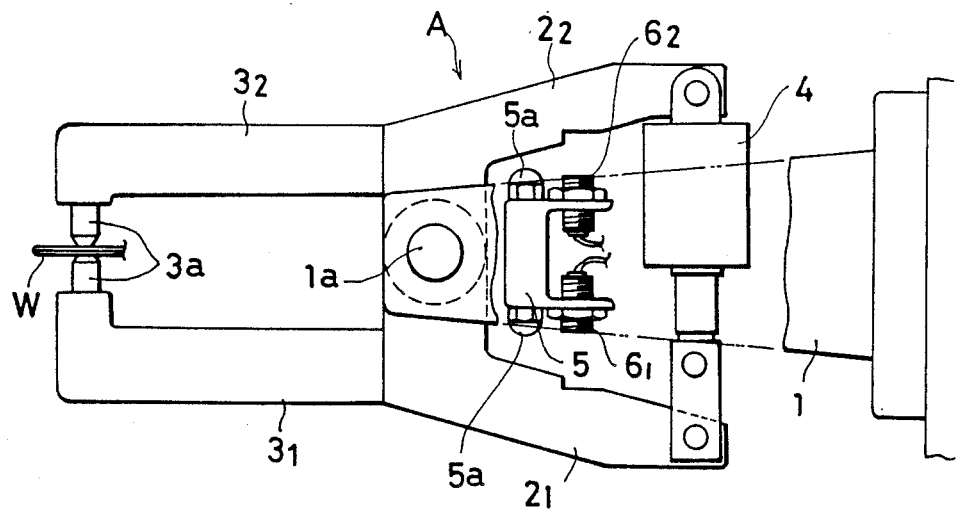
FIG. 1 is a side view of a welding gun according to one embodiment of the present invention.

DETAILED DESCRIPTION OF PREFERRED EMBODIMENTS:

Referring to FIG. 1, a welding gun body 1 is attached to the operating end of a robot (not shown). A pair of arm holders $2_1$ $2_2$, are pivotallly supported on a pivot $1a$ provided at the front end of the gun body 1. A pair of gun arms $3_1$, $3_2$ are attached respectively to the arm holders $2_1$, $2_2$. Each of the gun arms $3_1$, $3_2$ has an electrode tip $3a$ at its front end. A pressure cylinder 4 is provided between the tails ends of both the arm holders $2_1$, $2_2$, so that the expansion/contraction operations of the pressure cylinder 4 causes both the gun arms $3_1$, $3_2$ to swing toward their opening sides and closing sides.

As a whole, they are arranged to constitute an X-type welding gun A.

A bracket 5 is securely fastened to the gun body 1 having a pair of stoppers 5a, 5a disposed between the surfaces facing each other of the arm holders $2_1$ $2_2$ so as to control the opening degree of the welding gun A. The bracket 5 is further provided with a pair of optical distance sensors $6_1$, $6_2$ which face the arm holders $2_1$, $2_2$ respectively.

Figure 2:
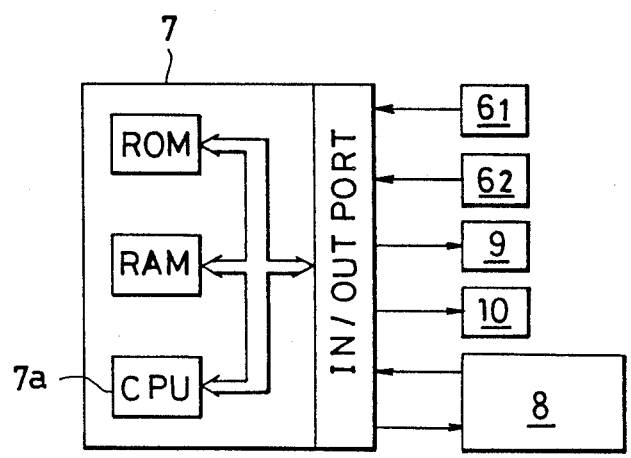
FIG. 2 is a schematic block diagram of a control apparatus according to one embodiment of the present invention.

Referring to FIG. 2, reference numeral 7 denotes a gun controller comprising a micro-computer, and 8 designates a robot controller. When the signal of arrival at a welding spot is inputted from the robot controller 8 to the gun controller 7, the pressure cylinder 4 is operated, through a pressure control circuit 9, to expand so that the gun arms $3_1$ $3_2$ are swung toward the closing side to clamp a workpiece W between the electrode tips 3a, 3a. Thereafter, the electrode tips are energized through an energization control circuit 10 for a predetermined period of time and then with the lapse of a predetermined hold time following the energization, the pressure cylinder 4 is operated through the pressure control circuit 9 to contract so that the gun arms $3_1$ $3_2$ are swung toward the opening side to open.

During this opening operation, signals outputted from the pair of distance sensors $6_1$ $6_2$ are stored in the gun controller 7 and, when the output signals of the sensors $6_1$ $6_2$ are both changed, the operation-instructing signal is transmitted from the gun controller 7 to the robot controller 8 so that the robot may be operated to move the welding gun A to the next welding spot.

Figure 3:
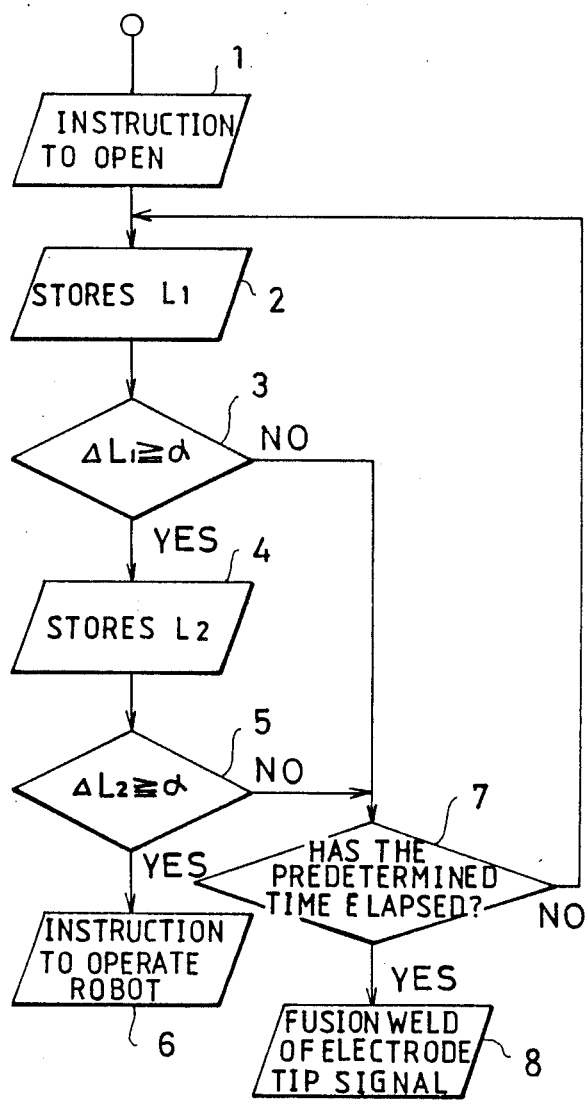
FIG. 3 is a flowchart thereof.

This operation will now be explained in more detail with reference to FIG. 3. After the lapse of the above-mentioned hold time, the gun controller 7 gives to the pressure control circuit 9 the instruction signal to open the welding gun A (step 1). Next, the gun controller 7 stores output L1 from one $6_1$ of the distance sensors (step 2) and determines with a CPU 7a whether or not $\Delta L1$ or its output change per unit time (e.g., 10 msec.) is equal to or more than the preset value $\alpha$ (step 3). If $\Delta L1 \geq \alpha$, it stores the output L2 from the other distance sensor $6_2$ (step 4) and determines with the CPU 7a in the same manner as the foregoing whether or not $\Delta L2$ or its output change per unit time is equal to or more than the preset value $\alpha$ (step 5). If $\Delta L2 \geq \alpha$, the operation-instructing signal is outputted and given to the robot (step 6).

When $\Delta L1 \leq \alpha$ or $\Delta L2 \leq \alpha$, the gun controller 7 moves on to the step 7 in which it determines whether or not a predetermined time (e.g., 30 msecs.) has elapsed after the instruction signal to open the welding gun A was outputted. If it is still before the lapse of the predetermined time, the operation is then returned to step 2 to repeat the foregoing steps of the discrimination. When $\Delta L1 < \alpha$ or $\Delta L2 < \alpha$ even after the lapse of the predetermined time, the operation is then advanced to the step 8 in which fusion weld of electrode tip signal is outputted to activate an alarm.

In this operation, if neither of the electrode tips 3a attached to the gun arms $3_1$ $3_2$ is fusion-welded to the workpiece, the gun arms $3_1$ $3_2$ are then both caused to swing toward the opening side by the contraction operation of the pressure cylinder 4 and at the same time with the start of this swing operation of the gun arms, the output signals from both the distance sensors $6_1$, $6_2$ start changing so as to indicate $\Delta L1 \geq \alpha$, and $\Delta L1 \geq \alpha$, so that the operation-instructing signal to operate the robot is outputted before both the gun arms $3_1$ $3_2$ are moved to the open position at which they are stopped by the stoppers 5a, 5a.

As is clear from the foregoing description, according to the present invention, it is determined from changes in outputs from a pair of distance sensors whether or not a pair of gun arms have started to move toward their respective opening sides and the robot is activated to move when both the gun arms have started alike to move toward their opening sides. When an electrode tip of either of the gun arms is fusion-welded to the workpiece, the robot can not be operated. This prevents the gun arms and the workpiece from being damaged. Another advantage of the present invention is that the time required to confirm that the welding gun is in the released or open position is reduced so as to improve the work efficiency.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control method for an automatic welding machine in which a welding gun is moved by a robot successively to a plurality of welding spots on a workpiece in order to carry out spot welding, said control method comprising the steps of:

detecting by a pair of distance sensors the respective movements of a pair of gun arms of the welding gun;

determining from changes in outputs of the respective distance sensors at the time when the welding gun is being opened after completion of the welding at each welding spot whether or not each gun arm has started to move toward its opening side; and operating the robot when it is confirmed that the gun arms have both started moving toward their opening sides.

2. A control apparatus for an automatic welding machine in which a welding gun is moved by a robot successively to a plurality of welding spots on a workpiece in order to carry out spot welding, said gun having a pair of gun arms, said control apparatus comprising:

a pair of distance sensors detecting the respective movements of each of the pair of gun arms of the welding gun;

a discrimination means which operates, at the time when the welding gun is being opened after completion of the welding at each welding spot, to store outputs of said distance sensors and determine from changes in said outputs whether or not each gun arm has started to move toward its opening side; and a signal generation means which outputs an instruction signal for operation of the robot when it is confirmed that both gun arms have started to move toward their opening sides and which outputs a fusion-weld-of-electrode-tip signal when at least one of the gun arms has not started to move toward its opening side even after the lapse of a predetermined time.

* * * * *